March 4, 1952 A. G. FOX 2,588,103
WAVE GUIDE COUPLING BETWEEN COAXIAL LINES
Filed Sept. 14, 1946 5 Sheets-Sheet 1
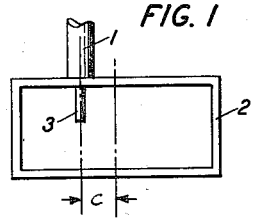
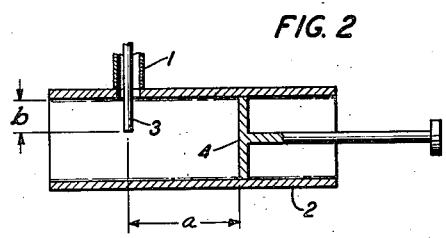
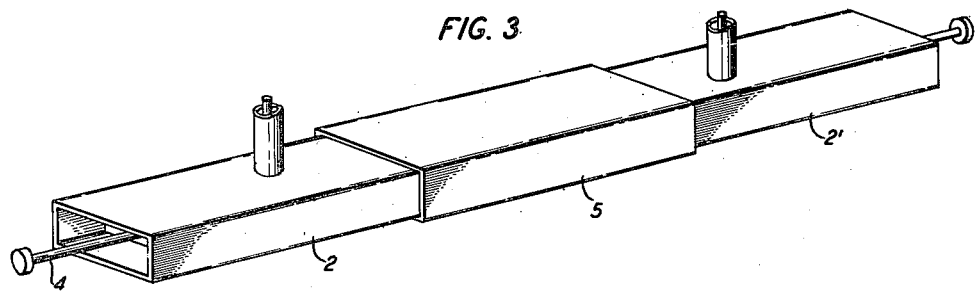
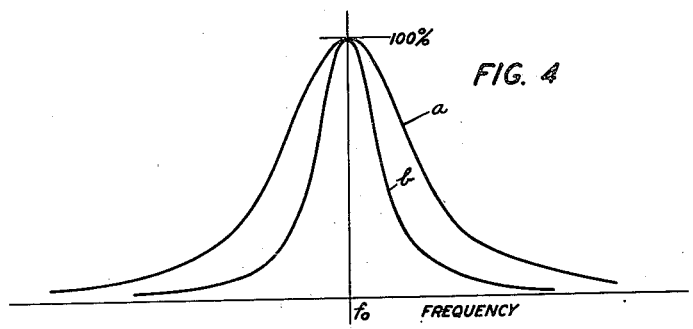
INVENTOR
A. G. FOX
BY
N. A. Ewing
ATTORNEY INVENTOR.
A. G. FOX
BY
N. D. Ewing
ATTORNEY March 4, 1952 A. G. FOX 2,588,103
WAVE GUIDE COUPLING BETWEEN COAXIAL LINES
Filed Sept. 14, 1946 5 Sheets-Sheet 3

INVENTOR
A. G. FOX
BY
N. A. Ewing
ATTORNEY

March 4, 1952          A. G. FOX          2,588,103

WAVE GUIDE COUPLING BETWEEN COAXIAL LINES

Filed Sept. 14, 1946          5 Sheets-Sheet 4

INVENTOR
A. G. FOX
BY
*N. D. Ewing*
ATTORNEY

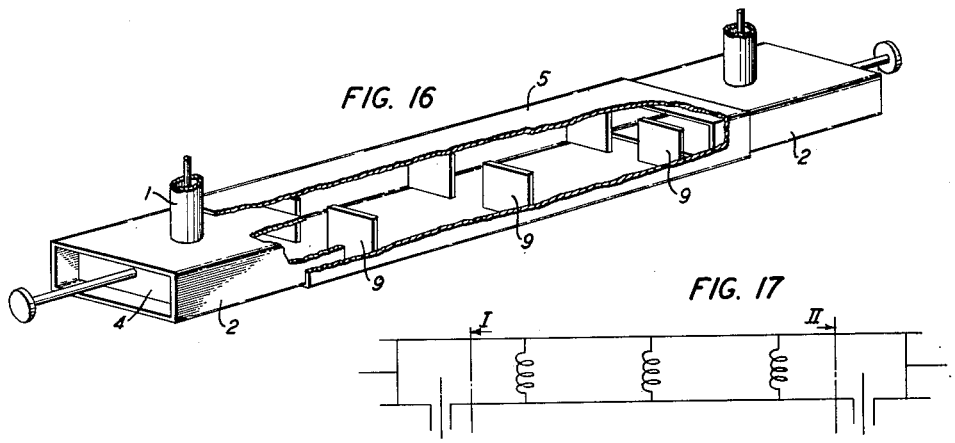
FIG. 16
FIG. 17
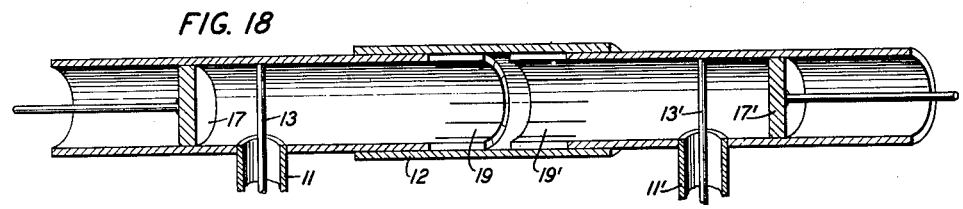
FIG. 18
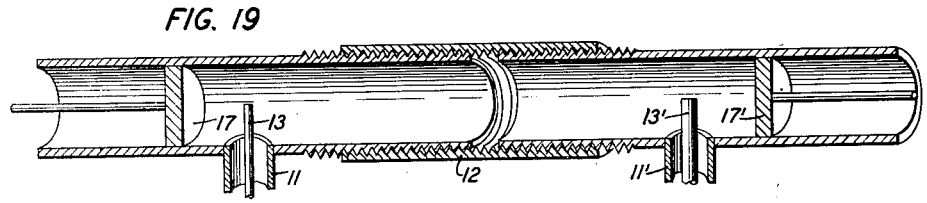
FIG. 19
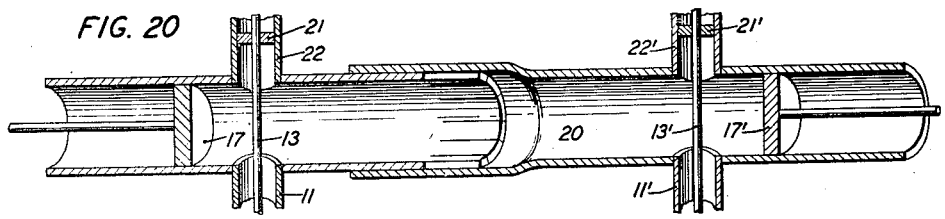
FIG. 20
INVENTOR
A. G. FOX
BY
ATTORNEY Patented Mar. 4, 1952

2,588,103

UNITED STATES PATENT OFFICE 2,588,103

WAVE GUIDE COUPLING BETWEEN COAXIAL LINES

Arthur Gardner Fox, Eatontown, N. J., assignor to Bell Telephone Laboratories, Incorporated, New York, N. Y., a corporation of New York Application September 14, 1946, Serial No. 697,107

1 Claim. (Cl. 178—44)

This invention relates to frequency selective wave transmission systems employing wave guide transformers.

A principal object of the invention is to simplify the structure required to achieve a predetermined frequency selective characteristic in a system of the kind described.

A feature of the invention resides in the conversion of electromagnetic waves from one mode of propagation to a wave guide mode and back to the original mode, with provision for improved selectivity characteristics by means of the reflections arising at the points of conversion.

Another feature of the invention is a pair of spaced coaxial lines connected by a wave guide structure, in which the reflections arising at the points of connections serve to produce a desired sharp selectivity characteristic.

Another feature of the invention is a pair of spaced coaxial lines connected by a wave guide in such a manner that impedance mismatch introduced at the points of connection therebetween results in a band transmission characteristic.

Another feature of the invention resides in the association of one or more coaxial to wave guide transition elements with a frequency selective network or filter in such a manner that the transitions serve as component parts of the network or filter, whereby a minimum number of circuit components is required.

In transmission systems employing very high frequencies it frequently becomes necessary to interpose therein a filter for the purpose of selecting a desired band of frequencies. In the case of transmission by means of coaxial lines, the filter may be placed directly in the coaxial line and may comprise coaxial line circuit elements as components thereof.

However, it may often be desirable to introduce into such systems networks or filters formed of wave guide components, because of their higher Q characteristics and their convenient, physical size.

It has been common practice to transfer high frequency energy from the coaxial line to a wave guide by means of a transition designed to provide an impedance match over a broad band of frequencies, then to pass the energy through a wave guide filter, and finally to reconvert the energy for transmission to an outgoing coaxial transmission line by means of another matched broad band coaxial to wave guide transition.

Systems for coupling coaxial lines by a resonant wave guide chamber or by a broad band wave guide filter have heretofore been disclosed, for example, in the United States Patent 2,106,768, issued February 1, 1938, to G. C. Southworth and in the United States Patent 2,281,550, issued May 5, 1942, to W. L. Barrow.

In accordance with the present invention, simple types of frequency selectivity characteristics may be obtained through the proper use of coaxial to wave guide transitions alone without the need of additional wave guide filter elements. Moreover, more complex network or filter characteristics, which ordinarily would require the use of wave guide circuit components interposed between the transitions, may be obtained by using fewer components in conjunction with the reflections set up at said transitions. The reflections, which would ordinarily represent an undesired disturbance to be eliminated as much as possible, are herein utilized to perform a useful function in providing desired frequency selective characteristics.

The invention may be more clearly understood by referring to the figures of the drawing wherein:

Fig. 1 is a cross-sectional view of a coaxial to wave guide transition;

Fig. 2 is a longitudinal section thereof;

Fig. 3 is a view of a frequency selective system;

Fig. 4 represents the frequency selective characteristics thereof;

Fig. 16 is a multiple iris filter system;

Fig. 17 is the equivalent schematic; and

Figs. 18, 19, 20 show cylindrical pipe systems in accordance with the invention.

Figure 5:
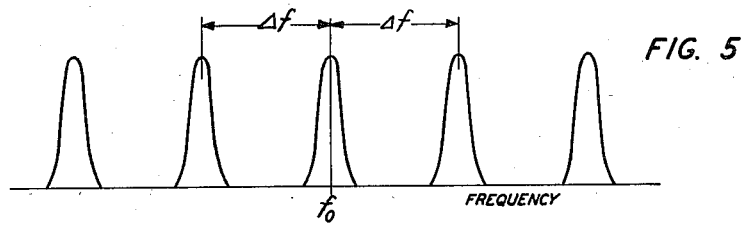
Fig. 5 shows a frequency selective characteristic curve with multiple peaked responses.

Referring to Figs. 1 and 2 of the drawings, a transition structure for converting from a coaxial to a wave guide mode of propagation is disclosed. Each transition involves a coaxial line 1 connected to a wave guide pipe 2 of rectangular cross section by means of a launching or terminal probe 3 for effecting a conversion from a coaxial to a wave guide mode of propagation. An adjustable piston 4, located in the wave guide 2 behind the probe 3 at a distance represented as $a$ in Fig. 2, serves as a reflector of waves.

The effect of varying the distance $a$ between the piston 4 and the probe 3 will be to vary the shunt reactance seen looking toward the probe from a section an infinitesimal distance to the left of the probe. Adjustment of the probe length $b$ (Fig. 2) will vary both the resistive and reactive components of the impedance, as will also the displacement $c$ (Fig. 1) of the probe from the center of the cross-section of the wave guide.

The "normal reflectionless adjustment" of the transition structure may be accomplished by either adjusting the probe length $b$ or displacement $c$ until the effective shunt resistance in the cross-section containing the probe is equal to the characteristic impedance of the wave guide. Thereupon, piston 4 is spaced from the probe 3 by an amount sufficient to neutralize the effective shunt reactance presented by the probe. The resulting impedance match is effective over a frequency band that has a width of approximately 10 per cent of the mean signaling frequency. The aforementioned probe and piston adjustments corresponding to the condition of impedance match are hereinafter designated the "normal adjustments."

In accordance with an embodiment of the invention illustrated in Fig. 3, a coaxial line transmission system may be set up by employing two such transitions 2, 2' "normally" adjusted as described previously, and coupled together by a slidable section of telescoping wave guide 5 for permitting adjustments in the length of the wave guide.

If the pistons 4, 4' in two such transitions are both displaced from their normal positions by the same amount, there will result impedance mismatch, which will set up a reflection from each thereof. Under these circumstances, the length of the intervening section of wave guide may be so adjusted as to cause the reflections from the two transition elements to be out of phase and mutually cancel. An efficient transmission of power through the system at the one frequency for which such adjustment was made, will then ensue.

As the frequency changes, the reflections will no longer exactly cancel out and the transmission will begin to fall off. In the latter case, the transmission will have a frequency characteristic as disclosed in Fig. 4, curve $a$, having its maximum at the frequency of adjustment $f_0$. The sharpness or selectivity of the curve may be varied by varying the position of the end pistons 4, 4'. As the pistons are moved farther from their "normal adjustment positions," the reflection coefficient at the individual transitions will increase, and the sharpness of the frequency characteristic will likewise increase, as shown by curve $b$ of Fig. 4. It will be necessary to readjust the distance between the transitions every time the pistons are moved to obtain maximum response at the desired frequency. In this manner, single frequency response curves of varying selectivity may be obtained by taking advantage of the reflections set up in the transitions.

For a very selective circuit, corresponding to curve $b$, the pistons 4, 4' may be placed close to the probes 3—the corresponding probe spacing along the intervening wave guide will be somewhat less than one-half wavelength. An alternative arrangement for a sharp selectivity characteristic would be to place the respective pistons slightly less than one-half wavelength from the probes, in which case the wave guide separation between the probes will be somewhat greater than one-half wavelength.

The exact positions and spacings of the probes and pistons may be best determined experimentally because of interaction factors difficult to evaluate exactly.

In general, a sharp transmission characteristic for a coaxial to wave guide system as described in connection with Figs. 3 and 4 will be similar in shape to the well-known resonance curve of a parallel tuned circuit. Repetitions of this response curve may also be expected in the neighborhood of harmonics of the frequency for which the original adjustment was made.

Figure 6:
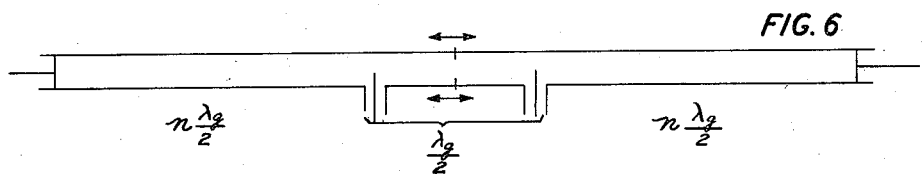
Fig. 6 is the corresponding coaxial-wave guide system in schematic form.

A transmission characteristic exhibiting multiple transmission peaks may be obtained from the structure of Fig. 6. Here the probes are about one-half wavelength apart and the pistons are many half wavelengths behind their "normal" positions. The individual transitions will be reflectionless at the nominal mid-band frequency, but since the electrical distance of the pistons from the probes is large it will change rapidly with change in frequency, and the transitions will rapidly become mismatched. This will produce a narrow response curve, and it will also cause a multiplicity of such responses. The greater the separation between the pistons and the probes, the narrower will be the individual transmission peaks and the smaller the separation between them. When the probe to piston distance is many half wavelengths, the frequency separation of the peaks will be given approximately by $$\Delta f = \frac{c}{l}\left(1 - \left(\frac{f_c}{f}\right)^2\right)$$

where $c$ is the speed of light, $l$ is the distance of the piston behind the probe $f_c$ and $f$ are respectively the cut-off frequency of the wave guide and the mid-band frequency.

However, it may be desired to specify the spacing between responses and the widths of the responses independently. The individual responses may be made still sharper by combining the two adjustment techniques described previously. For example, the desired separation between peaks may be attained by displacing the pistons the required number of half wavelengths behind the probes. The responses will then be further sharpened by moving the pistons a short distance away from the multiple half wave-length positions as determined above and readjusting the length of the center section of connecting wave guide for maximum transmission at the center response frequency. This will narrow the individual responses without altering the frequency separation between them.

Figure 7:
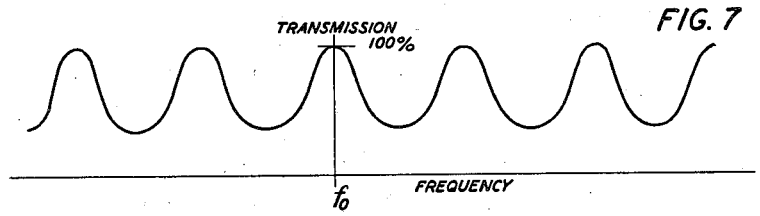
Fig. 7 shows a variant of the multiple response characteristic of Fig. 5.
Figure 8:
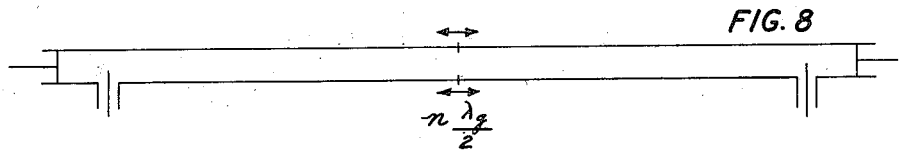
Fig. 8 is the correlated system in schematic form.

In both of the above basic methods of adjustment, (Figs. 3 and 6) the transmission falls essentially to zero at some point between the individual responses, and is substantially 100 per cent at the peak of the responses. There is still another technique of adjustment which may be employed where it is desired to have a transmission characteristic which exhibits a number of peaks, but which at no point falls to zero. This condition is indicated in Fig. 7. Fig. 8 shows the general proportioning of the structure required therefor. The pistons are approximately in their "normal" positions but displaced slightly therefrom. The distance between the probes is however several half wavelengths. The probe spacing is determined by the requirement on the frequency spacing of the transmission peaks. The closer together the transmission peaks are desired, the greater must be the number of half wavelength spacings between probes. The exact spacing between the probes is then determined by adjusting until the transmission at the midband peak is a maximum. The depth of the minima, that is, how nearly the transmission falls to zero between transmission peaks, is determined and controlled by adjusting the distance of the pistons from their "normal" positions. In general, the farther they are located from their "normal" positions, the deeper will be the transmission minima. For any change of the piston position, the connecting section of wave guide must be readjusted slightly to keep the center transmission peak at the proper frequency. The above performance can also be obtained by displacing the probe from its normal position in the cross-section of the wave guide, or by readjusting its length. Either of these will serve the equivalent of displacing the pistons from their "normal" positions.

Figure 9:
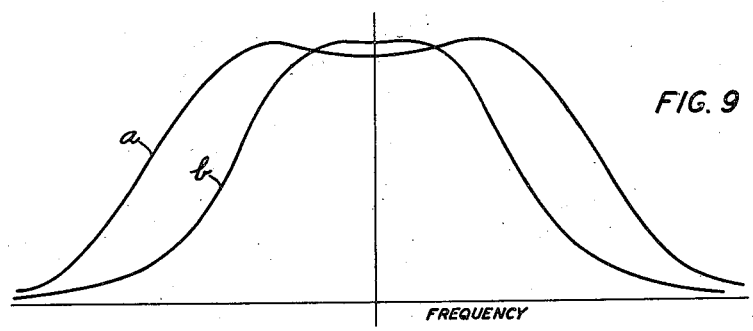
Fig. 9 shows various band-pass characteristics.

When a band-pass characteristic is required (Fig. 9) it may be obtained in the following way. The pistons are moved back from their "normal" positions by several half wavelengths as may be required to meet the selectivity requirement. The probes are lengthened or moved toward the center of the wave guide cross-section so that the effective shunt resistance placed across the wave guide at the cross-section of the probe is less than the characteristic impedance. The distance between the probes is finally adjusted for the correct degree of coupling. The resulting transmission characteristic will be Fig. 9, curve $a$, which closely resembles the type of characteristic obtainable from conventional double-tuned circuits of low frequency practice. The distance between the probes $h$ plays a role akin to the mutual inductance in the coupled circuits; adjustment of this distance will vary the effective degree of coupling, and determine whether the resulting characteristic has a pair of transmission peaks, or a single one representing critical coupling. Curves $a$ and $b$ represent these two characteristics respectively.

Figure 10:
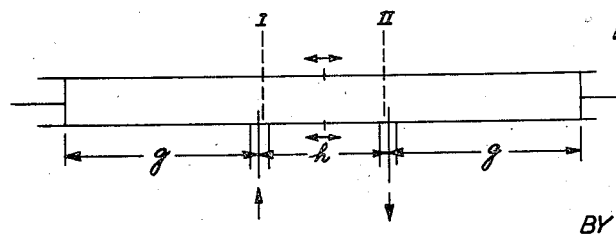
Fig. 10 is a schematic of the corresponding system.
Figure 11:
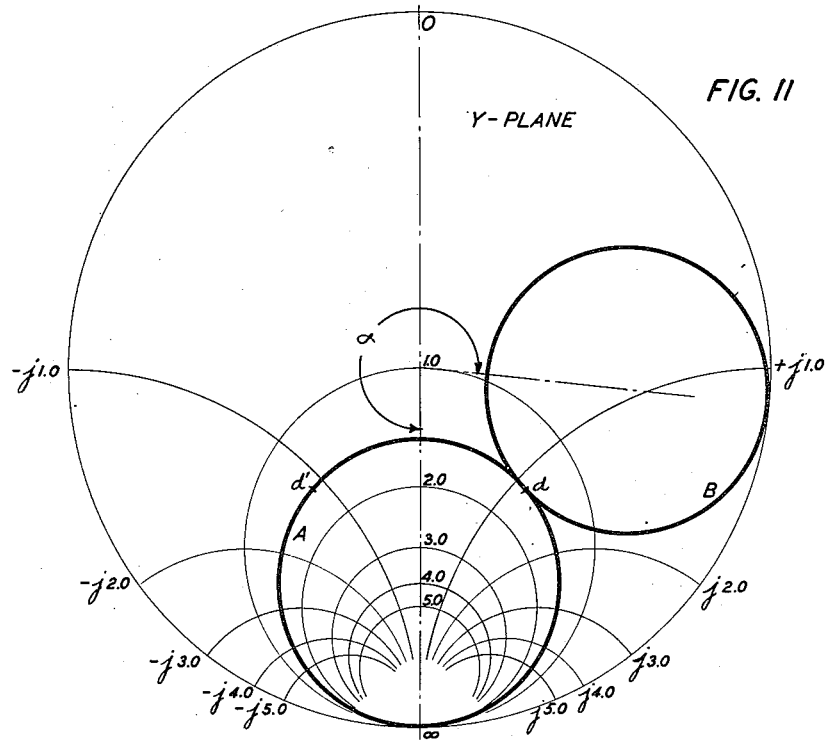
Figs. 11, 12, 13 are impedance circle charts for use in connection with the system of Fig. 10.
Figure 12:
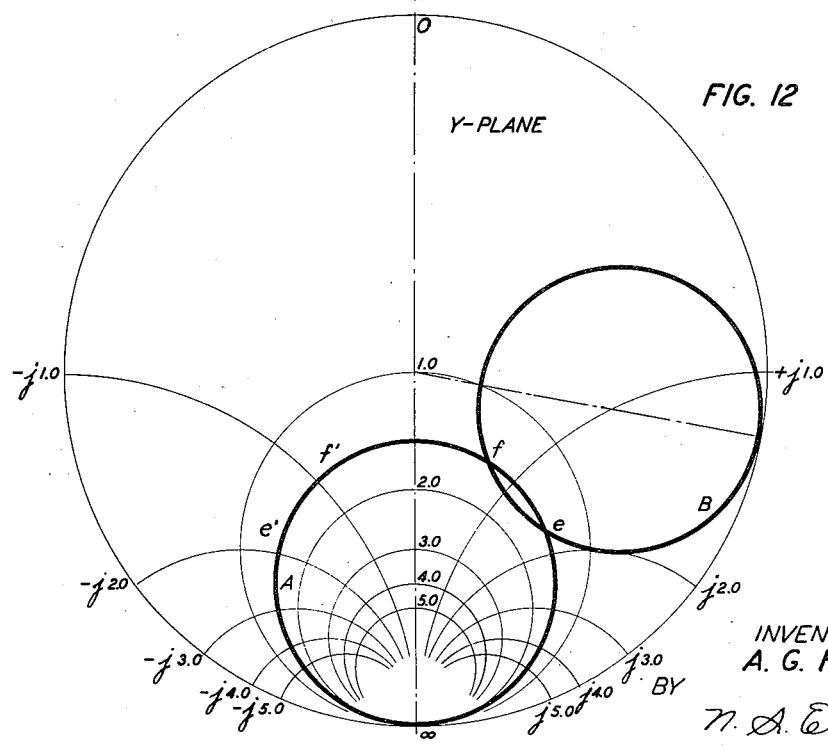
Figure 13:
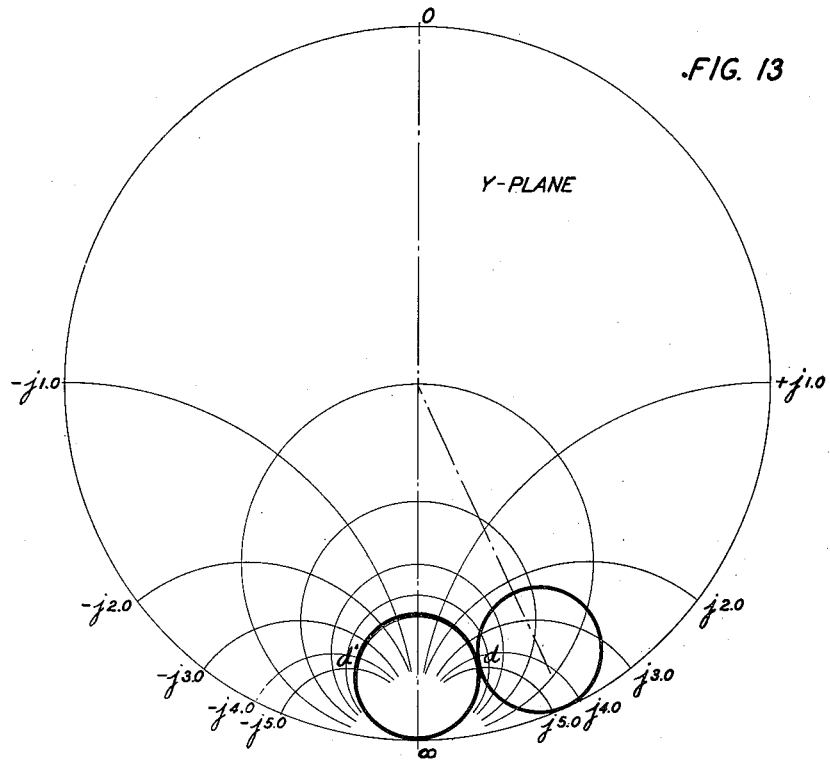

The underlying theory for the band-pass characteristics (Fig. 9) may be best understood by referring to Figs. 11, 12, 13 which represent circular transmission line charts in admittance form and to Fig. 10 which represents the band-pass system schematically. The direction of desired wave propagation through the system (Fig. 10) is indicated by the arrows. The admittance seen looking toward the right from section II will fall on circle A of Fig. 11; that is, as change in frequency causes the electrical length of $g$ to change, the admittance point will travel around the circle A. When viewed from section I, this admittance circle will appear to have been bodily revolved to the position of circle B, the angle $\alpha$ between the radial center lines of the circles being determined by the electrical distance between the probes. When viewed from section I, the admittance of the transition to the left of I will appear to lie on circle A. It will be noted that these two circles have been drawn tangent at point $d$. At that frequency where the admittance to the right of section I lies at $d$ on circle B, the admittance to the left of section I will lie at $d'$ on circle A. Since these two points represent the same shunt conductance and conjugate shunt susceptances, there will be an admittance match which will allow 100 per cent of the power to be transmitted. Furthermore, since these circles are tangent, this matched condition will be closely approximated over a range of frequencies, and the resulting transmission curve will look like curve $b$ of Fig. 9.

Suppose now that the distance between the two sections, and hence between the two probes, is increased slightly. This will cause the circle B to be revolved somewhat further in a clockwise direction as shown in Fig. 12. Now the circles intersect at two points $e$ and $f$. Following the same line of reasoning as used before, it may be concluded that for this new spacing of probes, there will be two closely adjacent peaks of 100 per cent transmission as indicated by curve $a$ of Fig. 9.

The above explanation of the behavior of the filter is contingent on the condition that the distance between the probes and their pistons is much greater than the distance between the probes. This means that the admittance points should travel around their respective circles so rapidly with change in frequency that the position of circle B does not change appreciably in the frequency range of interest. If this is not so, the theoretical explanation becomes more complex, although the performance is still much the same. In order to physically realize the performance just described, the probes must be lengthened beyond their normal extension so that the effective shunt conductance provided thereby is greater than the characteristic conductance. The pistons must be less than an integral number of half wavelengths from their normal positions, so that they shunt the probes with inductance; and the distance between the probes will be less than one half wavelength.

For the special case illustrated in Fig. 11, the effective shunt admittance seen looking directly into the coaxial to wave guide transitions should be at the mid-band frequency $Y=1.5-j1.1$, and the distance between probes should be $.383\lambda$. The pistons can be located at any number of different points spaced apart at half wavelength intervals. If they are relatively close to the probes, the transmission peaks will be broad because the admittance points will move around the circles slowly. If they are far from the probes, the peaks will be narrow. But in either case their shape will be essentially the same; they will be broader on top than would be true for a single tuned circuit of equivalent Q.

In this case as in previously described adjustments (Figs. 5 and 6) sharpening of the response by means of increasing the probe to piston spacing will bring secondary responses closer to the primary or mid-band response. An alternative method of sharpening the responses without moving the secondary responses so close to the primary response is to further increase the shunt conductance of the probe by increasing its length and/or by moving it closer to the center of the cross-section of the wave guide. In this case the admittance circles shrink in size as shown in Fig. 13 for an adjustment giving a single peak similar to critical coupling.

While the example just cited (Fig. 12) showed circle B lying to the right of circle A, it is possible to adjust the circuit so that circle B lies to the left of circle A. To obtain this condition, the separation $h$ between probes is made somewhat longer than one-half wavelength, and the pistons must be greater than an integral number of half wavelengths away from their normal positions.

Figure 14:
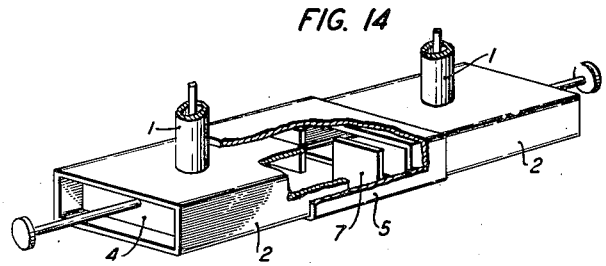
Fig. 14 is a band-pass filter in accordance with the invention.

Fig. 16 shows a form of band-pass filter of the two-cavity type which may be used to provide frequency selectivity in a coaxial transmission line. Fig. 17 shows the same system schematically. The shunt inductances indicated in Fig. 17 may be provided by any of the well-known forms of iris 9 or conducting rod. When used for this purpose the coaxial to wave guide transitions would be lined up for an impedance match at the mid-band frequency. However, by making use of the principles discussed above, it is possible to simplify the circuit of Fig. 16 to that of Fig. 14, thereby eliminating two iris structures.

Figure 15:
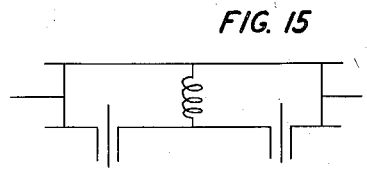
Fig. 15 is an equivalent schematic.

In the simplified filter (Fig. 14), a single iris is used and the probes shortened or moved farther from the center of the wave guide so as to present a higher shunt resistance component to the wave guide as seen from sections I or II. Thus, in the structure of Fig. 14, the transitions are intentionally made reflecting. The circuits of Figs. 14 and 16 will be electrically equivalent when the center iris is the same size for both of them. Experimentally the adjustment may be achieved as follows: The circuit of Fig. 14, which is represented schematically in Fig. 15, is first assembled with the proper size of center iris. Secondly, the coupling between the coaxial and the wave guide is adjusted by any or all of the following means: The length of the probe is adjusted, the position of the probe in the cross-section of the wave guide is adjusted, or the position of the probe along the axis of the guide is adjusted. Finally, the piston must be adjusted to obtain a symmetrical transmission characteristic. In general, best results will be obtained when the probe is about half-way between the piston and the iris and located in the center of the cross-section of the wave guide. For a sharply selective circuit, the distance between the iris and either piston will be less than one-half wavelength. Adjustment of the center iris will control the coupling between the contiguous wave guide chambers. Adjustment of the pistons will control the tuning of the chambers, while adjustment of the probe lengths and their positions will control the loading or Q of the chambers.

Whereas the embodiments heretofore described have been directed to wave guides of rectangular or square cross-section, it should be understood that cylinder wave guides with circular cross-sections may also be used in the practice of the invention. Thus, Figs. 18, 19 illustrate exemplary types of such systems. Each comprises a pair of coaxial to wave guide transition members 11, 11' of circular configuration coupled together by an adjustable section of circular wave guide pipe 12. In the structure of Fig. 18, the distance apart of the probes 13, 13' in the wave guide chamber may be controlled by a sliding joint, comprising spring terminal fingers 19, 19' telescopically fitted into guide section 12, whereas in Fig. 19 the adjustment is by means of a screw-threaded connection. In Fig. 19, the characteristic impedances $Z_1$ and $Z_2$ of the concentric conductors 11, 11' respectively, are different, whereas in Fig. 18, $Z_1=Z_2$. The reflecting pistons 17, 17' constitute movable walls for the wave guide section beyond the probes 13, 13' and may be adjusted to obtain various selectivity characteristics as previously described.

The spacing apart of the probes and the adjustment of the pistons for various selectivity characteristics will be controlled by considerations similar to those disclosed for the rectangular wave guides.

Referring to Fig. 20, which shows a telescopically adjustable wave guide coupling 20 for the coaxial lines, the probes 13, 13' are extended transversely through the wave guide 20 into concentric line stubs 22, 22' tuned by individual reflecting pistons 21, 21' to provide maximum transmission and conversion for the coaxial to wave guide mode and conversely.

Reflecting transitions from coaxial to wave guide may be employed to achieve other simplifications in filter circuits as will be apparent to those skilled in the art.

What is claimed is:

A frequency selective circuit comprising a pair of spaced coaxial lines, a low loss wave guide connecting said lines and forming therewith a network having frequency selective characteristics, said wave guide comprising end wave guide sections and an intermediate wave guide telescoping said end sections respectively, said end sections each having a coaxial to wave guide junction therein comprising a transverse terminal probe terminating the inner conductor of each coaxial line, pistons in said end guide sections located symmetrically beyond said probe at positions providing an impedance mismatch at said junctions, the length of said wave guide being adjustable to cause the reflections from said mismatched junction to be out of phase, said pistons being adjustable to vary the selectivity of said circuit.

ARTHUR GARDNER FOX.

REFERENCES CITED

The following references are of record in the file of this patent:

UNITED STATES PATENTS

| Number | Name | Date |
| --- | --- | --- |
| 2,253,589 | Southworth | Aug. 26, 1941 |
| 2,408,032 | Beck | Sept. 24, 1946 |
| 2,408,425 | Jenks | Oct. 1, 1946 |
| 2,415,242 | Hershberger | Feb. 4, 1947 |
| 2,416,168 | Fiske | Feb. 18, 1947 |
| 2,426,193 | Fernsler | Aug. 26, 1947 |
| 2,429,601 | Biskeborn | Oct. 28, 1947 |
| 2,433,368 | Johnson | Dec. 30, 1947 |
| 2,472,038 | Yando | May 31, 1949 |